A. WEED.
Improvement in Machines for Cutting Files.
No. 123,849.  Patented Feb. 20, 1872.
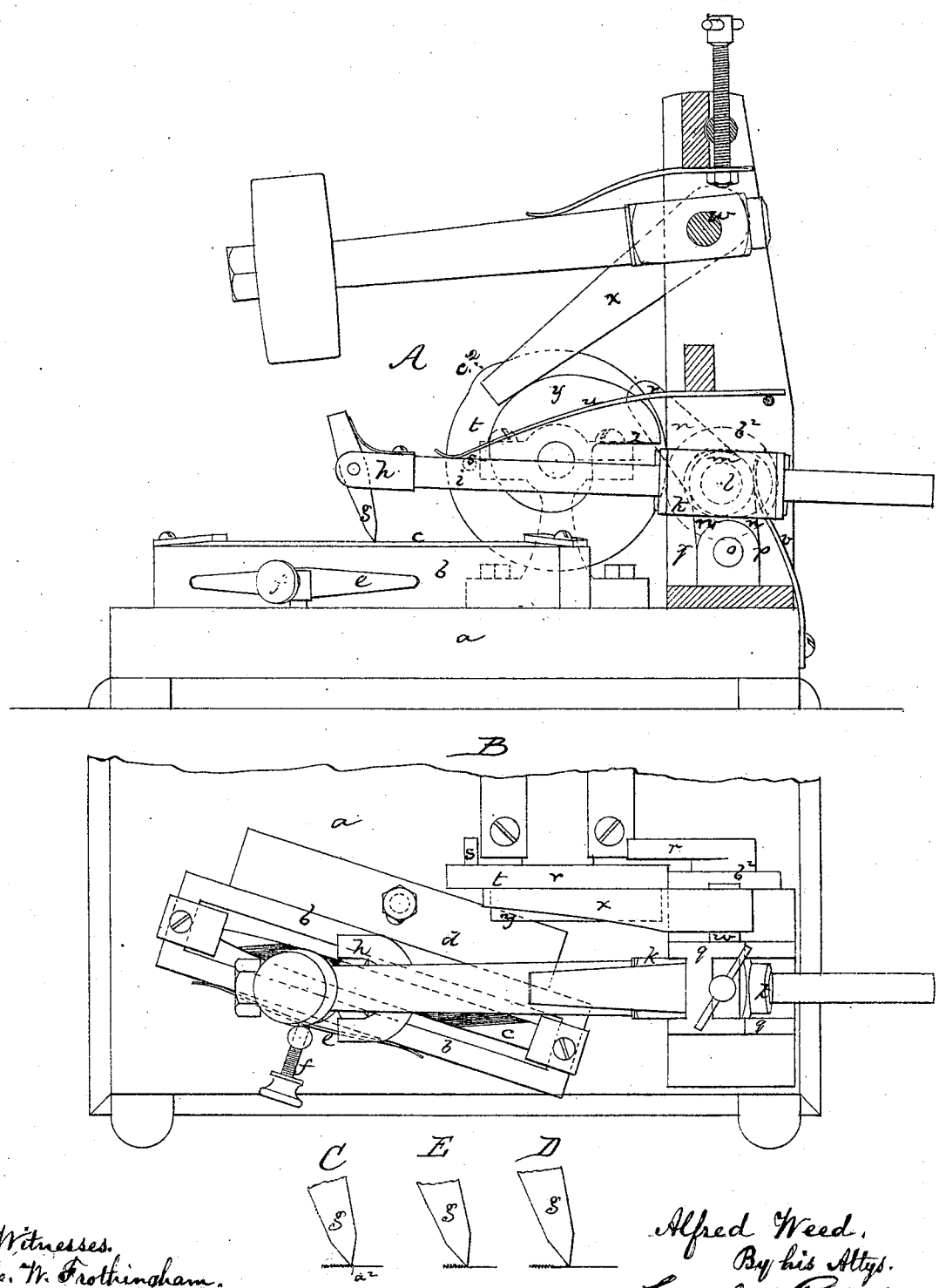

123,849

UNITED STATES PATENT OFFICE.

ALFRED WEED, OF BOSTON, MASSACHUSETTS.

IMPROVEMENT IN MACHINES FOR CUTTING FILES.

Specification forming part of Letters Patent No. 123,849, dated February 20, 1872.

*To all whom it may concern:*

Be it known that I, ALFRED WEED, of Boston, in the county of Suffolk and State of Massachusetts, have invented an Improvement in Cutting Files; and I do hereby declare that the following, taken in connection with the drawing which accompanies and forms part of this specification, is a description of my invention sufficient to enable those skilled in the art to practice it.

In cutting files by machine, it is customary in all cases, so far as I know, to feed the file or file-bed by a positive and arbitrary feed mechanism, the intermittent feed being regular, without regard to the nature of the metal surface against which the cutter acts, or the depth or nature of the cut made, the feed being of course adjustable as to length, but the feed-movements being regular and only modified by such adjustment. In my invention, my object has been to make the feed of the file contingent upon the character of each tooth cut, by making the tooth itself, or the spur raised behind the cutter by its blow, an agent in the feed. To effect this, I raise the cutter after each blow and move it back, then let it down upon the uncut face of the blank behind the spur raised by the cutter in forming the last tooth, and then push it forward, so that when it reaches the spur it will press against it, and thereby move the blank forward, the hammer then descending and imparting to the cutter the blow that forms the groove and raises the spur. The movement of the chisel or cutter is arbitrary, but its ultimate position on the face of the file depends upon the point where the cutter finds the spur, and indirectly upon the size of the spur. It is in such method of effecting the feed of the file-blank that the invention primarily consists.

The drawing represents a machine embodying the invention.

A shows the machine in side elevation. B is a plan of it.

$a$ denotes the bed-plate of the machine; $b$, the movable bed, in the top of which the blank $c$ to be cut is secured, the blank immediately resting upon a proper support, by which the face of the blank will be kept in position during the action of the cutter, the blank being fastened to the bed by any suitable clamping devices. The movable bed $b$ rests and slides freely upon the bed $a$, and at one side rests against a guide, $d$, up to which it may be held by a suitable spring, $e$, the stress of the spring being regulated by a screw, $f$, or other suitable device or devices. $g$ denotes the cutter, pivoted in a fork, $h$, at the end of an arm, $i$. This arm is mounted in a swiveled and vertically-oscillating sleeve or bearing, $k$, at the end of a short rocker-shaft, $l$, extending through a sleeve, $m$, from which sleeve extends an arm, $n$, jointed by a pivot, $o$, to a bearing, $p$, the sleeve $m$ extending through a slot in the upright $q$, so that it can have a forward-and-back movement. The cutter-arm $i$ is fixed to and moves with the bearing $k$, but has a capability of rotative movement in the bearing, so that the edge of the cutter may conform to the plane of the top of the blank. At the outer end of the shaft $l$ is an arm, $r$, by upward movement of which the shaft is turned and the forward end of the cutter-arm raised, this upward movement being effected by a pin, $s$, projecting from the side of a cam-wheel, $t$, the arm being thrown down at proper times by the stress of a spring, $u$. The cutter being thus moved up and thrown down, its forward-and-back movements are produced by a spring, $v$, and a cam on the periphery of the cam-wheel $t$, and the movements of the cutter take place in manner as follows: At A the cutter is shown in position ready for the blow of the hammer, the edge of the cutter being against the last-formed spur, but preferably slightly straightened up, to more effectually cut. The hammer is shown as uplifted or partially uplifted, the hammer-helve being hung upon a shaft, $w$, at the end of which is an arm, $x$, which arm rests upon the periphery of a cam, $y$, on the driving-shaft, the hammer being thrown down by the stress of a suitable spring when the drop $z$ of the cam passes the arm $x$, the blow forming the notch and raising the spur $a^2$, as shown at C, leaving the edge of the cutter in the position shown at C. As soon as the blow is given, the cam $y$ slightly raises the hammer, after which the pin $s$ strikes the arm $r$, tripping up said arm, and raising the cutter above the blank, and as the cutter rises, the cam $t$, acting against a roll or collar, $b^2$, on the shaft $l$, throws back the sleeve $k$, and thereby carries the cutter-arm back, so that when the cutter next descends, its edge will be in the position on the blank, seen at D, the cutter-arm dropping and letting the cutter down, as the end of the arm $r$ passes the pin $s$, the cutter-arm bearing or sleeve $k$ being held back by the cam $t$ until the cutter has dropped. But, when the cutter has dropped, an incline, $c^2$, on the periphery of the cam-wheel passes off the roll $b^2$, and the sleeve $k$ is then free to be fed forward by the stress of the spring $v$, this forward movement causing the cutting-edge to slide over the smooth surface of the blank until it reaches the spur, as seen at E, and to then push forward the file-blank, (and its bed,) the extent of this forward movement being, of course, determined by the extent of movement permitted by the cam-incline and the position or form of the spur cut. The feed of the file having been thus effected, the cutter is again in position for the blow of the hammer, previous to which blow, however, a swell on the face of the cam-wheel $t$ may press back the roll slightly, thereby moving back the cutter-arm and straightening up the cutter, slightly freeing the face of the cutter from the face of the spur, and bringing the cutter into better position to form the next tooth. The hammer then again descends, forcing the cutter again into the blank, as seen at C. By these movements and operations, the process of hand-cutting is closely imitated, the workman in hand-cutting, first striking the cutter and forming the tooth, then lifting it and carrying it back of the spur or tooth formed by the blow, then pushing it forward and against said spur, and then again giving the blow. Instead of giving to the cutter the upward, backward, downward, and forward movements, as described, the file-bed may be drawn forward after the cut, until the spur passes the cutter, (the cutter being first raised or not, as may be desirable,) the bed being then pressed back until the spur strikes the cutter, which will, of course, bring the parts into position for the next cut. The details of organization of the machine may, of course, be varied, but the arrangement of mechanism shown is effective.

I claim as my improvement in machines for cutting files—

The combination therein of mechanism to automatically move the cutter over and behind the tooth just previously cut, and to then carry it forward to and against the spur of said tooth, and the utilization of the spur of each successively-made tooth as means of gauging the proper position of the cutter for the next fall of the hammer, and as an instrument in connection with the cutter for securing a proper succession of the cuts upon and along the surface of the blank, substantially as described.

ALFRED WEED.

Witnesses:
FRANCIS GOULD,
M. W. FROTHINGHAM.